United States Patent
Heilman et al.

(10) Patent No.: US 12,457,097 B2
(45) Date of Patent: Oct. 28, 2025

(54) ZERO TRUST AUTHENTICATION

(71) Applicant: CLOUDFLARE, INC., San Francisco, CA (US)

(72) Inventors: Ethan Heilman, Boston, MA (US); Lucie Mugnier, Boston, MA (US); Sharon Goldberg, Boston, MA (US); Yuval Marcus, Boston, MA (US); Sebastien Lipman, Boston, MA (US)

(73) Assignee: CLOUDFLARE, INC., San Francisco, CA (US)

( * ) Notice: Subject to any disclaimer, the term of this patent is extended or adjusted under 35 U.S.C. 154(b) by 757 days.

(21) Appl. No.: 17/590,657

(22) Filed: Feb. 1, 2022

(65) Prior Publication Data

US 2023/0246816 A1 Aug. 3, 2023
US 2024/0356735 A9 Oct. 24, 2024

Related U.S. Application Data

(60) Provisional application No. 63/149,994, filed on Feb. 16, 2021.

(51) Int. Cl.
 *H04L 29/06* (2006.01)
 *H04L 9/08* (2006.01)
 *H04L 9/32* (2006.01)

(52) U.S. Cl.
 CPC ............ *H04L 9/0825* (2013.01); *H04L 9/085* (2013.01); *H04L 9/0869* (2013.01); *H04L 9/3213* (2013.01); *H04L 9/3247* (2013.01)

(58) Field of Classification Search
 None
 See application file for complete search history.

(56) References Cited

U.S. PATENT DOCUMENTS

| | | | |
|---|---|---|---|
| 2015/0082024 A1* | 3/2015 | Smith | H04L 63/0861 713/155 |
| 2016/0285843 A1* | 9/2016 | Popovich | H04L 63/0815 |
| 2016/0309327 A1* | 10/2016 | Grimault | H04W 12/068 |
| 2017/0317997 A1* | 11/2017 | Smith | H04L 9/3247 |

(Continued)

OTHER PUBLICATIONS

International Search Report and Written Opinion for PCT Application No. PCT/US2022/0016401, filed Feb. 15, 2022; mailed May 10, 2022; 16 pages.

(Continued)

*Primary Examiner* — Eleni A Shiferaw
*Assistant Examiner* — Hassan A Hussein
(74) *Attorney, Agent, or Firm* — NICHOLSON DE VOS WEBSTER & ELLIOTT LLP

(57) ABSTRACT

Systems and methods for zero trust authentication. In certain embodiments, a method may comprise providing, from a client computing system to an identity provider (IdP) authority, an authentication nonce value generated by hashing a random value and a public key of the client computing system, and receiving, at the client computing system from the IdP authority, an authorization token including the authentication nonce value, where the authorization token is signed by a private key of the IdP authority. The method may further comprise providing a message including the authorization token from the client computing system to a target computing system via an intermediary co-signer (ICS) configured to authenticate the message.

16 Claims, 10 Drawing Sheets

(56) References Cited

U.S. PATENT DOCUMENTS

| | | | | |
|---|---|---|---|---|
| 2019/0036706 | A1* | 1/2019 | Detert | G06K 19/07 |
| 2019/0312733 | A1* | 10/2019 | Engan | H04L 63/126 |
| 2020/0059362 | A1* | 2/2020 | Brody | H04L 9/3242 |
| 2020/0293749 | A1* | 9/2020 | Tang | G06K 7/1417 |
| 2021/0216612 | A1* | 7/2021 | Wojcik | H04L 9/3247 |
| 2021/0281408 | A1* | 9/2021 | Liu | G06F 7/588 |
| 2021/0336966 | A1* | 10/2021 | Gujarathi | H04L 9/3247 |
| 2022/0198363 | A1* | 6/2022 | DeLuca | G06Q 10/06395 |
| 2022/0207454 | A1* | 6/2022 | Carey | G06Q 10/00 |

OTHER PUBLICATIONS

Alaca et al., "Comparative Analysis and Framework Evaluating Web Single Sign-On Systems", ACM Computing Surveys; vol. 53, No. 5; Sep. 28, 2020; 35 pages.

Hammann et al.; "Privacy-Preserving OpenID Connect", Designing Interactive Systems Conference; Oct. 5, 2020; 13 pages.

* cited by examiner

ZERO TRUST AUTHENTICATION

CROSS-REFERENCE TO RELATED APPLICATION

The present application claims priority to U.S. provisional patent application, Application No. 63/149,994, filed Feb. 16, 2021, titled "Provisional Patent Application".

SUMMARY

In certain embodiments, a method may comprise providing, from a client computing system to an identity provider (IdP) authority, an authentication nonce value generated by hashing a random value hashed along with a public key of the client computing system, and receiving, at the client computing system from the IdP authority, an authorization token including the authentication nonce value signed by a secret key of the IdP authority. The method may further comprise providing a message including the authorization token from the client computing system to a target computing system via an intermediary co-signer (ICS) configured to authenticate the message.

In certain embodiments, a method may comprise receiving a message from a client system at an intermediary co-signer (ICS) configured to authenticate communications between the client system and a target system, and extracting an authorization token from the message at the ICS, the authorization token including an authentication nonce value signed by an identity provider (IdP) authority. The method may further comprise verifying a signature of the IdP at the ICS, verifying, at the ICS, the authentication nonce based on a random value of the authentication nonce hashed with a public key of the client system, and authenticating and providing the message from the ICS to the target system when the verifications are successful.

In certain embodiments, a method may comprise providing, from a client computing system to an identity provider (IdP) authority, a random value hashed with a public key of the client computing system as an authentication nonce value; receiving, at the client computing system from the IdP authority, an authorization token including the authentication nonce value signed by a secret key of the IdP authority; and providing, from the client computing system, a message including the authorization token, the message directed to a target computing system via an intermediary co-signer (ICS) configured to authenticate the message. The method may further comprise receiving the message from the client computing system at the (ICS); extracting the authorization token from the message at the ICS; verifying a signature of the IdP from the authorization token at the ICS; verifying, at the ICS, the authentication nonce based on the random value the public key of the client computing system; and authenticating and providing the message from the ICS to the target computing system when the verifications are successful.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
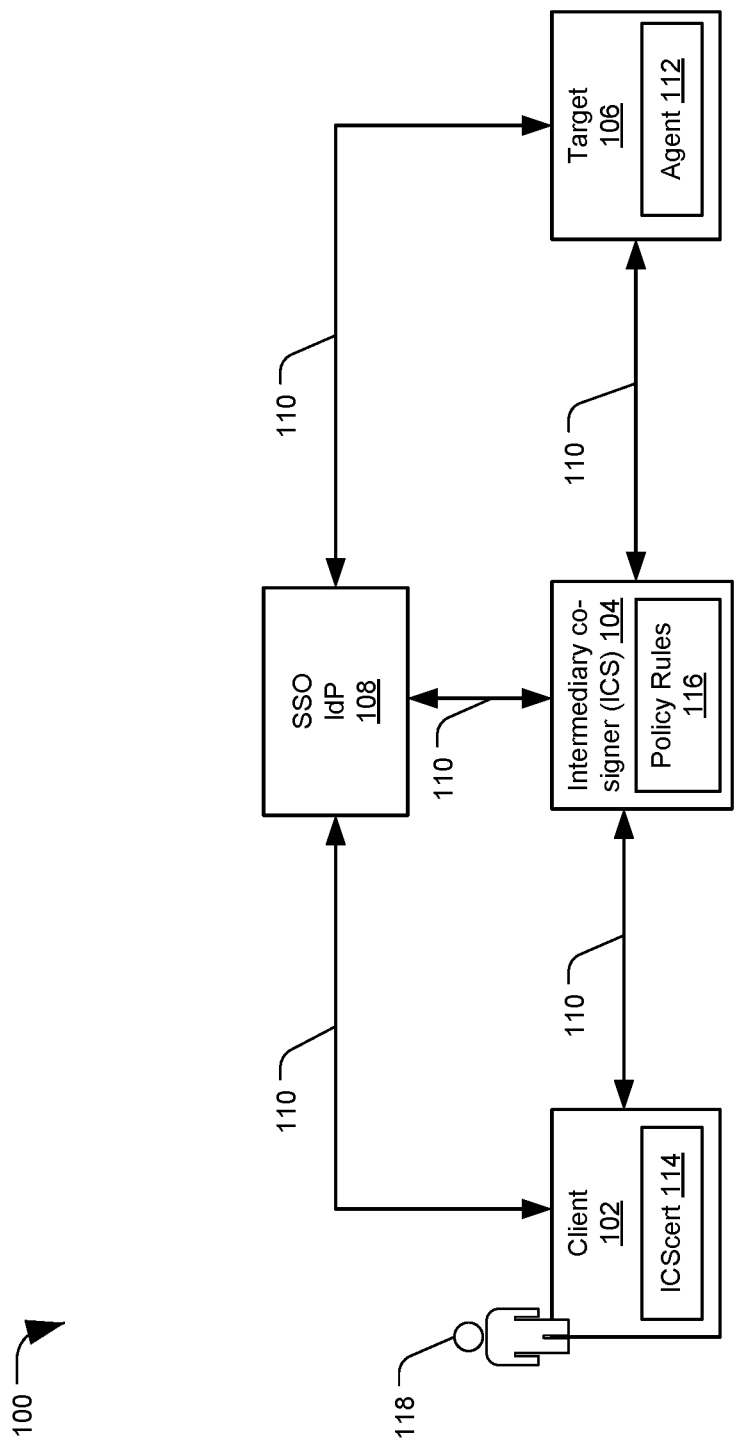
FIG. 1 is a diagram of a system configured for zero trust authentication, in accordance with certain embodiments of the present disclosure.

FIG. 1 is a diagram of a system 100 configured for zero trust authentication, in accordance with certain embodiments of the present disclosure. System 100 may include a client device or system 102, an intermediary co-signer (ICS) 104, a target device or system 106, and an identity provider (IdP) 108, such as a single sign-on (SSO) IdP. Components of system 100 may communicate via communication channels 110.

A user 118 of client 102 may wish to remotely access a target 106. A target 106 may include a server, container, or other computer or operating system environment. Enabling a target 106 for remote access can present security challenges in preventing unauthorized users from accessing the target 106, or in preventing users 118 with limited authorization from exceeding their access rights.

Various methods may be employed for enabling secure remote access, many of which may have significant limitations. For example, a user 118 may remotely access target systems 106 using a virtual private network (VPN) and secure shell (SSH) keys. However, VPNs may be expensive to maintain, SSH keys may be difficult to manage in dynamic environments, user rights may be difficult to revoke, and a malicious actor that gains control of a user client 102 may obtain full access to the target 106, among other problems. Another option may be to employ a bastion host as a point of access between clients 102 and targets 106. The bastion host may allow easier management of user access rights and improved access logging security. However, if the bastion host has full access credentials to all targets 106, a compromised bastion host may result in a malicious actor obtaining unrestricted access to the targets 106.

An improved approach may be to provide a zero trust system where no single user or component is fully trusted and has unrestricted access rights. Zero trust may refer to a security concept where an organization should not automatically trust any actor, inside or outside its system, and should verify all access attempts to its system. The proposed system 100 can rely on multiple signatures from different components to verify a user's 118 identity and ensure the legitimacy of received commands prior to execution. The zero trust system discussed herein may allow for a client to access a target, with distributed verification and authentication that does not rely on encryption.

In the system 100, the client 102 may generate an authorization certificate 114 (sometimes called an ICS certificate or ICScert) based on an authorization or authentication token obtained from the IdP 108. The IdP 108 may be, for example, a single sign-on (SSO) service provider, via which a client 102 can use a single sign-on operation to obtain access to multiple systems. The IdP 108 may provide the client 102 with a token with the IdP's signature, which may grant the client 102 access rights to the associated systems. In some examples, the client 102 can provide uniquely identifying or secret information to the IdP 108 via channel 110 as part of the sign-in process, which the IdP 108 may sign and return to the client 102, via channel 110, as part of the authorization token.

In addition, rather than employing a bastion host with full access credentials to the target 106, an intermediary co-signer (ICS) 104 may be employed to validate client 102 access requests based on login information and the ICS certificate 114, according to a set of authentication and access policy rules or instructions 116. The policy rules 116 may comprise a set of computer instructions or access requirements applied by the ICS 104 to client 102 access requests. The ICS 104 may authenticate the ICS certificate 114 by contacting IdP 108 via channel 110 (e.g., via an HTTP or API-style access request) to verify the identity token originally acquired by client 102 from IdP 108. The ICS 104 may be a form of bastion host that is configured to withstand attacks and log access operations to a target 106, but that does not have full access credentials to the target 106. The ICS 104 may be located within a controlled domain of the target 106, or it may be remote from the target 106, for example being implemented as a software as a service (SaaS) asset. If the ICS 104 validates the client 102, the ICS 104 can add its own access credentials to those of the client 102, for example by signing the client's 102 message with the ICS's own secret key.

An agent 112 situated at the target 106 may receive the client access request, and validate that all client messages are signed by both an IdP-certified user 118 or client 102, and authenticated by the ICS 104. The agent 112 may include program module or instruction set configured to communicate with the ICS 104 and validate messages received at the target 106. The agent 112 may also authenticate the ICS certificate 114 by contacting IdP 108 via channel 110, as described above in regard to the ICS 104. An example agent 112 may include a systems manager SSM agent. If all credentials are verified by the agent 112, the client 102 may be granted the requested access to the target 106. In this way, a user 118 cannot access a target 106 without validation from both an IdP 108 and ICS 104. Similarly, the ICS 104 cannot access the target 106 without first receiving a valid request from an authorized client 102. Therefore, the target 106 can remain secure even if any given component in system 100 is compromised. Access dependent upon validation of both the client 102 and the ICS 104 may be implemented without reliance on encryption. Further, the ICS 104 may operate as a man-in-the-middle using clear-text communication, and the system 100 can operate without encryption.

The protocol proposed in system 100 may not eliminate the need for trust, and instead it minimizes the amount of trust required for any single actor in the system. No actor is trusted by any other implicitly; therefore, there may be some root of trust for each of the three actors: client 102, ICS 104, and target 106.

The root of trust for the client 102 may be the authorization token from the IdP 108, that attests to the user's 118 or client's 102 identity and public key in a signed, verifiable token. Therefore, even though the client 102 may be self-reporting, the token may be easily verified via a trusted 3rd party (e.g., the IdP 108 or associated Certificate Authority).

The root of trust for the ICS 104 may be through the use of transport layer security (TLS) WebSocket connections 110 with the target 106, with the client 102, or both. In the negotiation of establishing a TLS Websocket 110, the ICS 104 can provide its certificate, proving its identity (according to the Certificate Authority that issues the certificate). From there, a TLS connection 110 may be trusted to route packets correctly and, therefore, if a packet arrives "from the ICS 104," the client 102 and target 106 can trust it to be from a known source. Accordingly, the ICS 104 may optionally not need to sign messages (e.g., using its secret key) to prove that those messages have been verified by and sent from the ICS.

The root of trust for the target 106 may be a self-certifying public key with which it signs any communication the target 106 replies to. While this may require a significant amount of trust in the target 106, a unique Target ID may be assigned on registration of the target 106 with the ICS 104 that may be equal to a hash of the target's 106 public key. This Target ID may ensure the target 106 cannot just use any arbitrary key set.

An aspect of zero-trust authentication as presented herein is that the target 106 need not place unilateral trust in the ICS 104 for sensitive actions, and the ICS 104 may not be trusted sufficiently to run arbitrary commands on the target 106. However, there may be a few operations the ICS 104 may be trusted to do:

1. Map target 106 names to target 106 IDs;
2. Set and verify policy rules 116; and
3. Target 106 shell output.

As used herein, a shell may refer to a computer program or communication channel allowing access to a target 106, and which may be established between client 102 and target 106 via ICS 104. Further, there are a number of actions that can be performed from a client 102 or ICS 104 in regard to the target 106, some of which may be performed unilaterally by the ICS 104 (e.g., without a user's 118 permission or a client 102 signature). An example structure may be similar to REST (Representational State Transfer), in the form of <action>/<id>. Example actions may include:

| Action Name | Action description | Requires User Sig |
|---|---|---|
| OpenShell shell/create | Opens a shell; returns shell_id | Yes |
| CloseShell shell/close/<id> | Closes an open shell | No |
| ShellInput shell/attach/<id> | Sends keystrokes to a shell with shell_id = <id> | Yes |
| ShellList shell/list | List open shells. Add/<user> for shells associated with a certain user | No |
| Open SSH tunnel ssh/open | Opens SSH subprocess; return subprocess_id | Yes |
| Close SSH tunnel ssh/close | Closes SSH subprocess | No |

The proposed system 100 can provide various features and characteristics:

Dual Consent: The agent 112 may not accept any remote commands without approval from both the ICS 104 and the user 118. The ICS 104 can veto or consent depending on the user's 118 validity and permissions.

Trustless: The agent 112 may not execute the ICS's 104 remote commands unilaterally nor completely trust the user 118 to execute within its allowed permissions. Trust can be decentralized, minimizing the trust placed in any single component of the system, such that the system protects against any single compromised actor.

Invisible: From the user's 118 perspective, system 100 should not require any additional responsibilities, interactions, or key management tasks. A user 118 may not be able to detect this feature.

Immutable: Any message communication may not allow for the removal, modification, or insertion of any previous message by any single actor in the system 100. For example, the ICS 104 may maintain an immutable log of communications between client 102 and target 106.

Loggable by Intermediary: Any message communication can be clear-text, readable, and loggable by an intermediary (or man-in-the-middle) who may be unable to modify, delete, or insert messages. For example, the ICS 104 may be configured to log communications, but may be unable to modify logged messages or add its own messages.

Multi-User Shell: A new user 118, or the same user 118 logging in through a different client 102, may be able to join an existing shell session without corrupting the logs.

Policy Protection: The ICS 104 may not grant a non-admin user 118 admin right on any target 106.

Figure 10:
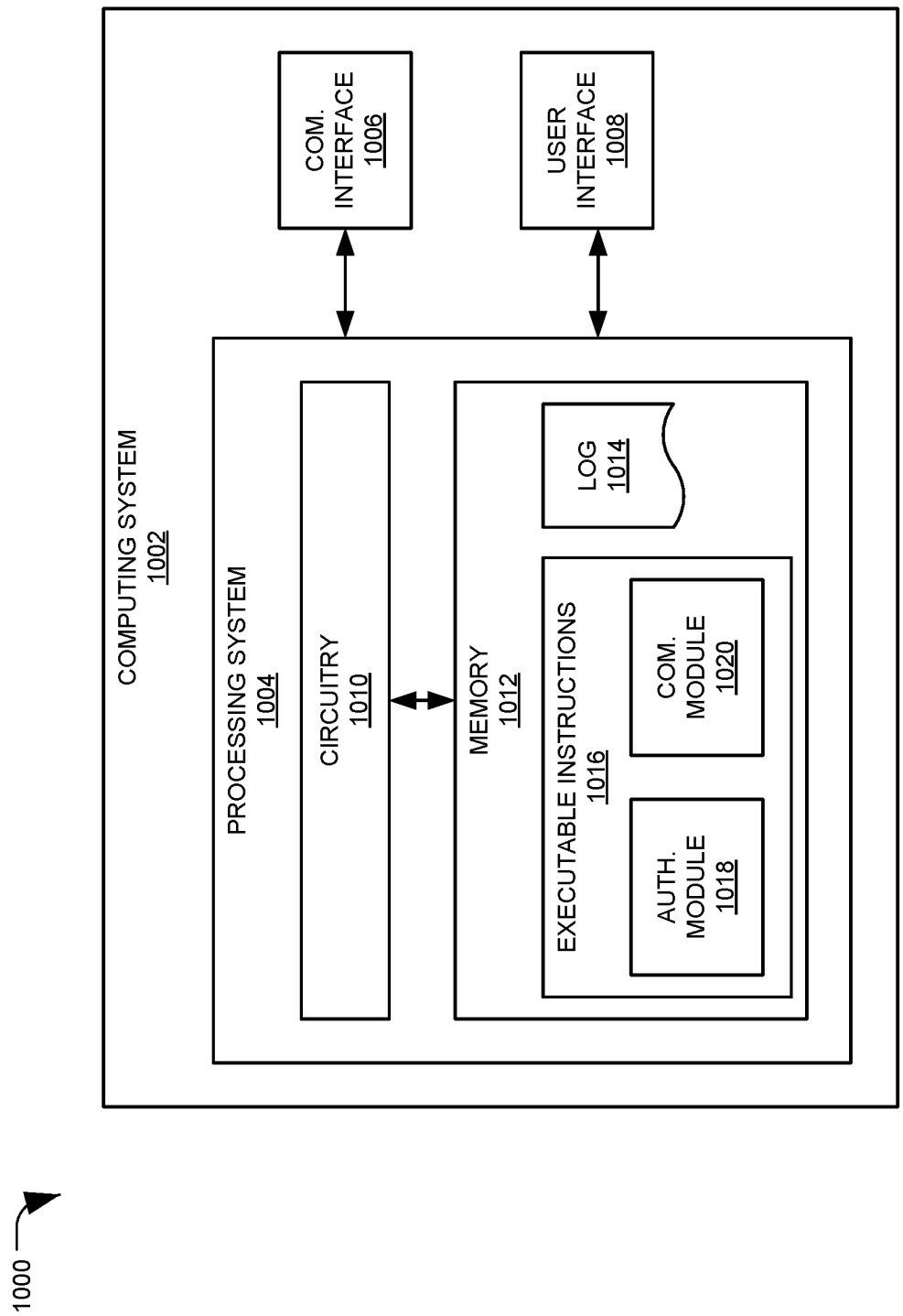
FIG. 10 is a diagram of a system configured for zero trust authentication, in accordance with certain embodiments of the present disclosure.

Client 102, ICS 104, Target 106, IdP 108, and agent 112 may be implemented as computer systems, circuits, software or other executable instructions, or any combination thereof. An example computer system for implementing the components is shown in FIG. 10. A client 102 may be a single login session, so that a single user can have multiple associated clients 102. Communication channels 110 may include wired or wireless communication paths via local area networks (LANs) or wide area networks (WANs), and may include numerous types of communication mediums and intermediary devices, switches, routers, etc. The communication channels 110 may use various communication protocols, including HTTP and API-based protocols. For example, Transport Layer Security (TLS) Websocket communication protocols may be used for communications between client 102 and ICS 104, and between ICS 104 and target 106. Transmissions across communication channels 110 may be secure or unsecure. A communication session within an example system 100 is described in regard to FIG. 2.

Figure 2:
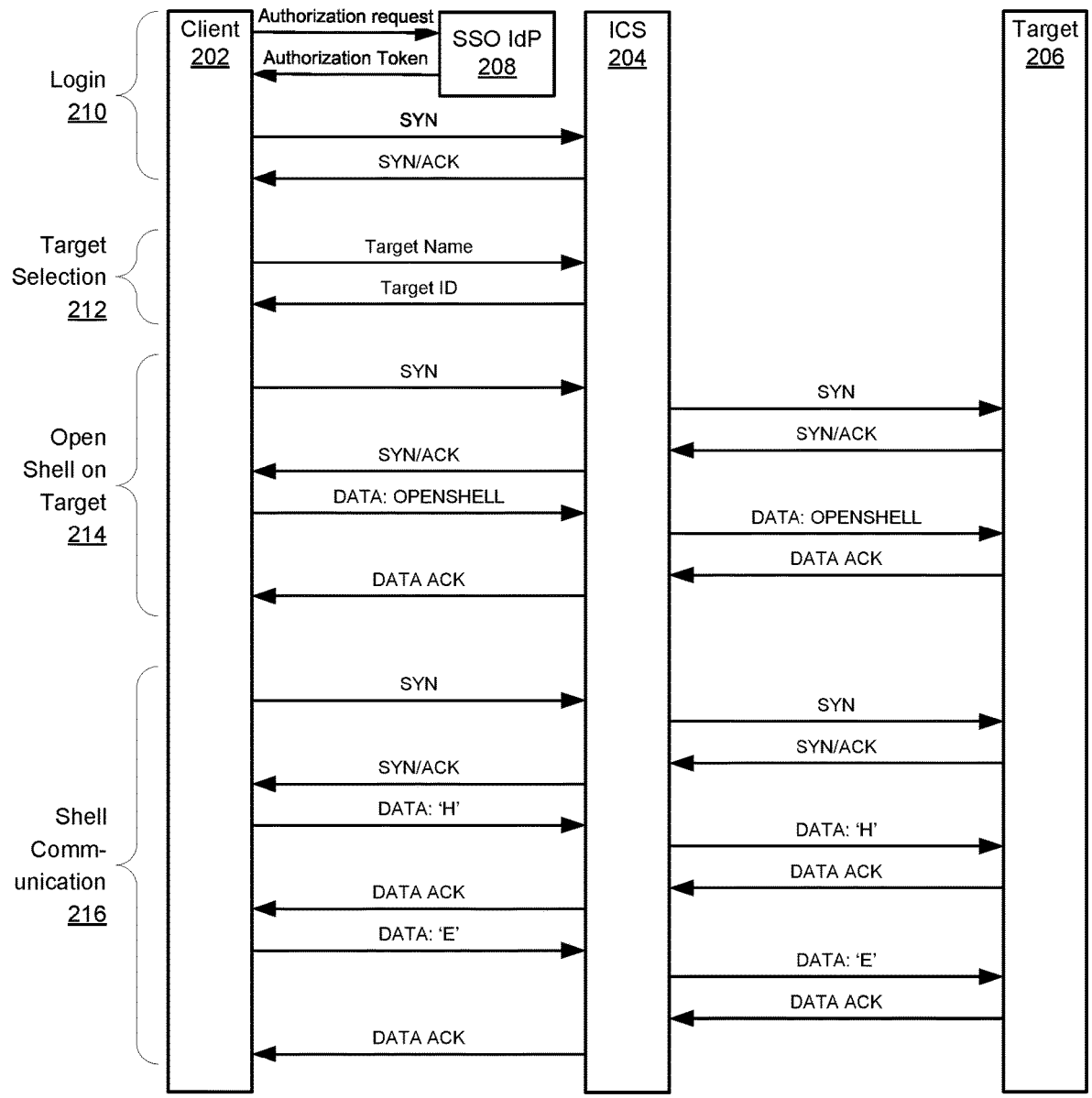
FIG. 2 is a timing diagram of communications in a system configured for zero trust authentication, in accordance with certain embodiments of the present disclosure.

FIG. 2 is a timing diagram 200 of communications in a system configured for zero trust authentication, in accordance with certain embodiments of the present disclosure. Client 202, ICS 204, target 206, and IdP 208 may be examples of corresponding elements from system 100. In particular, diagram 200 shows an example process of establishing a connection between a client 202 and a target 206, and the exchange of data between them. The process may include multiple verification steps, the failure of any of which may generate an error indicator (e.g. sent to client 202, logged at ICS 204, logged at target 206, or otherwise presented) and the failing message not being executed. To facilitate the discussion of processes within the system, the following glossary is presented to define symbols, variables, and terminology.

| Symbol | Definition | Notes |
|---|---|---|
| c | Client | A client may be a single login session of a user. |
| t | Target | |
| ICS | Intermediary co-signer | E.g., bastion host |
| IdP | Identity provider | May be an SSO provider; e.g., Google ® or Microsoft ® |
| $ID_t$ | Target id | Cryptographic identity of a target, e.g., SHA3-256($PK_t$) |
| $ID_c$ | Client id | Cryptographic identity of a client, e.g., SHA3-256($PK_c$) |
| $r_c$ | Client-chosen random value | E.g., 32 bytes |
| $r_t$ | Target-chosen random value | E.g., 32 bytes |
| ($PK_c$, $SK_c$) | Client's (Public Key, Secret Key) | |
| ($PK_t$, $SK_t$) | Target's (Public Key, Secret Key) | |
| ($PK_{ICS}$, $SK_{ICS}$) | ICS's (Public Key, Secret Key) | |
| ($PK_{IdP}$, $SK_{IdP}$) | IdP's (Public Key, Secret Key) | |
| $\sigma_c$ | Client signature | Signed by $SK_c$ |
| $\sigma_t$ | Target signature | Signed by $SK_t$ |
| $\sigma_{ICS}$ | ICS signature | Signed by $SK_{ICS}$ |
| $\sigma_{IdP}$ | Identity provider signature | Signed by $SK_{IdP}$ |
| SSO_com | Initial authorization token (e.g., JavaScript Object Notation Web Token (JWT) SSO token) which commits to $PK_c$ and CERanc in its nonce, signed by $SK_{IdP}$ | May have expiry time. IdP signature may be valid even if underlying JWT is expired. |
| SSO_id | Most recent, non-expired authorization token | In some cases, SSO_com = SSO_id |
| SSO_refresh | Authorization refresh token | Used by c to obtain new SSO_id from IdP when previous authorization token expires. |
| CERrand | Random value chosen by client | Used in AUTH_nonce as part of a verifier of c identity. |

-continued

| Symbol | Definition | Notes |
| --- | --- | --- |
| ICScert | ICS Certificate = (SSOcom, SSO_id, $PK_c$, CERanc) | Attests to various things, incl.: user is Alice, Alice's client pubkey is $PK_c$, Alice's org is Acme |
| CERanc | Certificate ancillary information = (CERrand, (CERrand)$\sigma_c$) | Signed randomness to prove Alice can generate a signature |
| AUTH_nonce | Authorization or authentication nonce = Hash($PK_c$, CERrand, (CERrand)$\sigma_c$) | Nonce sent as part of authorization request (e.g. OpenID Connect (OIDC) request) and returned unchanged in SSO_com. Used to commit to $PK_c$. |

When a user 118 wishes to be authorized at the ICS 204 or access target 206, the user may begin a login session 210 for client instance 202. Broadly, the login process 210 may include the client 202 sending an authorization request to IdP 208 (e.g., via logging in through an SSO operation), and receiving an authorization token in return. The authorization tokens may be OAuth tokens obtained through OIDC protocols. The authorization request may include secret or uniquely identifying information of the client 202, and the authorization token may include the uniquely identifying information, signed by the IdP 208. The client 202 may send the signed authorization token to the ICS 204 in a SYN (synchronize) message. The ICS 204 may verify the IdP signature, and verify the user's identity, thereby authorizing the client 202 in a SYN/ACK (synchronization authorization or acknowledgement) message. In more detail, a login operation 210 may include the following steps between an example user Alice 118 and her client 202, an IdP 208, and an ICS 204. Steps attributed to Alice or her client 202 may be performed, manually or automatically, via a computing system operated by Alice.

1. The user 118, Alice, may initiate the login process through a client c, 202.
2. Alice generates a key pair for her client 202, ($PK_c$, $SK_c$), and chooses a random number, CERrand. The keys may be chosen ephemerally during each login operation 210.
3. Client 202 computes (CERrand)$\sigma_c$ by signing CERrand with the client's 202 secret key: Sign($SK_c$, CERrand).
4. Client 202 generates an authorization request to send to an IdP 208, and sets a nonce value in the authorization request to AUTH_nonce=Hash($PK_c$,CERrand, (CERrand)$\sigma_c$)=H($PK_c$, CERanc). The AUTH_nonce may be a uniquely identifying or secret value generated by client 202, including two copies of the randomly-generated value CERrand: one signed by client 202's private key, and one not.
5. IdP 208 computes and sends client 202 an authorization token, called SSO_com, attesting to Alice's identity. The IdP 208 may include the unaltered AUTH_nonce in SSO_com, and may sign the AUTH_nonce, the SSO_com, or both. In this manner, client 202 obtains a copy of the uniquely identifying AUTH_nonce value that has been signed by a trusted IdP 208 authority. The IdP 208 may also return a refresh token called SSO_refresh, which may also be signed by the IdP. The SSO_refresh token may be used by client 202 to obtain a new authorization token (e.g. SSO_id) in the event that the previous authorization token (e.g. SSO_com, and subsequent SSO_id's) expires.

6. Client 202 generates an ICS certificate (ICScert) based on the authorization token. The ICScert is described in regard to FIG. 3.

Figure 3:
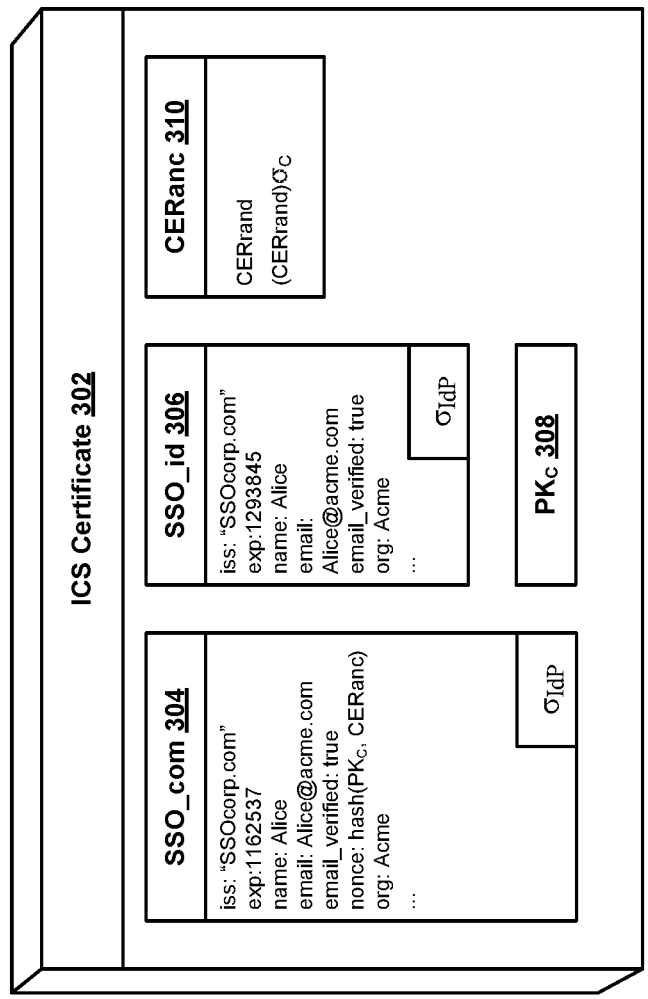
FIG. 3 is a diagram of a system configured for zero trust authentication, in accordance with certain embodiments of the present disclosure.

FIG. 3 is a diagram of a system 300 configured for zero trust authentication, in accordance with certain embodiments of the present disclosure. In particular, FIG. 3 depicts an intermediary co-signer (ICS) certificate (ICScert) 302, which may be generated by a client 202 to authenticate the client 202 or user 118 as part of a process to remotely access a target system 206.

Client 202 may initially compute the ICS certificate 302 as:

$$\text{ICScert} = (\text{SSO\_com } 304, \text{SSO\_id } 306 = \text{SSO\_com}, PK_c\ 308, \text{CERanc } 310).$$

SSO_com 304 may include various information identifying the IdP 208 and validating Alice's identity, such as name, email, organization, and the AUTH_nonce provided by client 202. The AUTH_nonce, the SSO_com 304, or both may be signed by the IdP 208. Accordingly, client 202 can use its uniquely identifying AUTH_nonce, signed by the IdP 208, to uniquely validate client 202. The SSO_com 304 may also include an expiry date or time.

When the SSO_com 304 expires, client 202 may use the long-lived SSO_refresh token to obtain a new SSO_id 306, and may update the ICScert 302. This new identity token, SSO_id 306, may not have the AUTH_nonce and may not commit to client 202's public key. Accordingly, the SSO_com 304 may be kept as part of the ICScert 302 even after the SSO_com 304 expires, as the signed AUTH_nonce may still be used to validate client 202 even after the SSO_com 304 expires. Returning to FIG. 2, the login process 210 may be continued from where client 202 generated the ICScert 302.

7. Client 202 may send the ICScert to the ICS 204 in a SYN (synchronize) message. This can register client 202's pubkey with the ICS 204, and can verify client 202's pubkey is correctly formed.
8. After receiving the SYN message, the ICS 204 can verify:
   a. SSO_com and SSO_id expiry (e.g., that the most recent authorization token, SSO_com or SSO_id, is still valid);
   b. IdP's 208 signature. The ICS 204 may contact IdP 208 (e.g., via communication channels 110) or otherwise obtain a trusted copy of IdP's public key, $PK_{IdP}$, which can be used to verify the signature on SSO_com or AUTH_nonce created by IdP's 208 secret or private key, $SK_{IdP}$.
   c. AUTH_nonce=H($PK_c$, CERanc). The ICScert includes unhashed versions of $PK_c$, CERrand, and (CERrand)$\sigma_C$, which can be used to verify whether AUTH_nonce is the correct value. The hashing algorithm employed by client 202, the cipher suite, may be established or verified prior, such as during the establishment of a TLS connection between the client 202 and ICS 204.

The ICS 204 may verify the above information on only an initial login or SYN message from client 202, on each SYN message, on every message, periodically, or any combination thereof.

9. Upon verifying the above information, ICS 204 may log client 202 in, and may return a SYN/ACK message to the client 202.

After logging in, client 202 may initiate a target selection operation 212, to identify an address for target 206 with which to connect. The target selection operation 212 may operate similar to a domain name system (DNS) lookup operation, and can map a human-memorable target 206 name to a cryptographic target 206 ID. Steps of the target selection operation 212 may include:

1. Client 202 may send a target name request to ICS 204, requesting the ICS 204 to provide a target identifier, $ID_t$, associated with a particular target 206 name.

2. The ICS 204 may access a lookup table (LUT) using the target name, locate one or more associated target IDs ($ID_t$), and returns them to client 202.

Once the client 202 has acquired the target 206 ID, the client 202 can initiate a process 214 to communicate or interact with the target 206. For example, the client 202 may start or open a shell on the target 206. The shell may give client 202 access to the operating system or other resources of the target 206 remotely. Steps or operations attributed to target 206 may be performed by an agent program or system 112 executed at the target 206. The agent may be a driver or module associated with the ICS 204 and configured to cooperate with ICS 204 for communication and verification operations. Steps of the operation 214 to open a shell on a target may include:

1. Client 202 may generate a random value, $r_c$.

Figures 4A, 4B:
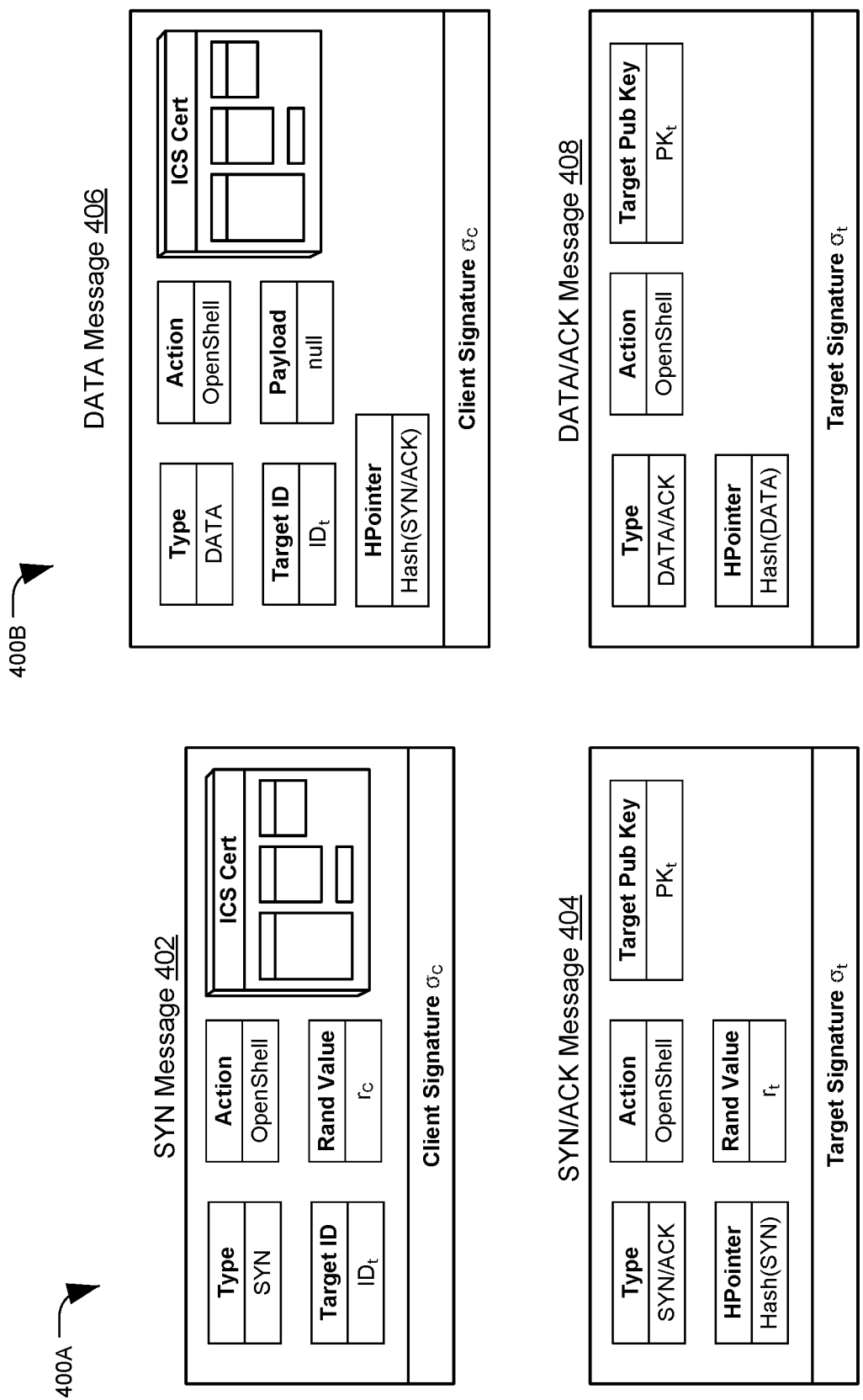
FIGS. 4A and 4B depict a set of messages for zero trust authentication, according to certain embodiments of the present disclosure.

2. Client 202 generates and sends a SYN message to ICS 204, and stores a hash of (e.g., a hash pointer to) the SYN message at the client 202. An example embodiment of the SYN message is depicted in FIG. 4A. FIG. 4A depicts a set of messages 400A, including a SYN message 402 and a SYN/ACK message 404, according to certain embodiments of the present disclosure. The SYN message 402 may include a "type" field, an "action" field, a "Target ID" field, a "random value" field, and a copy of the ICScert. The type field may identify the message 402 as a SYN message, as the start of a 'handshake' operation to perform the corresponding "action". The "action" field may designate that the client 202 wishes to open a shell to the target 206 identified by the "target ID" field. The "random value" field may include a value generated by the client 202, and may be used to prevent replay attacks that would involve re-sending previous messages. The SYN message 402 may then be signed by the client 202 using the secret key, $SK_c$.

3. Returning to the "open target" operation 214 of FIG. 2, the ICS 204 may check whether client 202 or Alice is authorized to take the action requested in the SYN message 402 on the specified target, and validates the SYN message 402. For example, ICS 204 may maintain or have access to a log or database or permissions regarding which users are permitted to take which actions on which targets 206. Validation of the SYN message 402 may include operations similar to or the same as those performed by the ICS 204 during the login operation 210, and may include checking expiry values, verifying the IdP 208 signature on the SSO_com of the ICScert, or other operations. The ICS 204 may focus on verifying that the client 202 is who it claims to be (e.g., based on the ICScert) and that the client 202 has the right to access the requested target and perform the actions, but may also perform validation of the client's 202 signature on the messages or other security operations. If the SYN message 402 is validated, the ICS 204 may sign the SYN message 402 using ICS's 204 secret key, $SK_{ICS}$, and forward the signed message to the target 206 identified in the message. In some embodiments, the ICS 204 may not sign the message, and other credentials may be used to verify that the ICS 204 cleared the message. For example, forwarding a message over a TLS connection may verify that the ICS 204 has checked and authenticated the message.

4. The target 206 may read and validate the SYN message 402. Validation may include verifying the ICS 204 signature on the SYN message 402 or other credentials (e.g., that the message was received across a trusted TLS connection), verifying the client 202 signature, and verifying the SSO_com details. The target 206 may perform validation operations on every message, on every SYN message, periodically, or on other triggers or intervals. When a target 206 encounters a new authorization token (e.g., SSO_com, SSO_id), it may perform a number of verification steps, which may include:

a. Check expiry of authorization token.
   b. Check IdP 208 signature valid. This may include obtaining the IdP 208 public key from a trusted source. In some embodiments, hash-based message authentication code (HMAC) and 'none' signature algorithms are not allowed.
   c. Check issuer (IdP 208) is a trusted authority.
   d. Check email of user 118 is verified. Email verification may be used as proof of membership in a permitted organization, or for other purposes.
   e. Check the organization of the user 118 matches the organization of target 206.

If the message is valid and authorized, the target 206 may compute a random value, $r_t$, and incorporate it into a SYN/ACK (synchronization authorization) message 404, as depicted in FIG. 4A. The target 206 may also calculate and store a hash value of the SYN/ACK message 404.

As shown in FIG. 4A, SYN/ACK message 404 may include "type", "action", and "random value" fields, as in SYN message 402. In addition, the target 206 may calculate a hash value of the SYN message 402, and include it in the SYN/ACK message 404 in an "HPointer" field. The hash may be used for associating responses with the corresponding SYN message, and for verifying that the SYN message 402 was not modified prior to receipt by the target 206. The SYN/ACK message 404 may also include a "target public key" field, which may be used to provide the client 202 with the target's 206 public key for verifying target 206 signatures. The target 206 may then sign the SYN/ACK message 404, and return it to the ICS 204.

5. Returning again to FIG. 2, the ICS 204 may receive the SYN/ACK message 404 from the target 206 and forward it to the client 202.

6. Client 202 may receive the SYN/ACK message 404, and may compare the hash of the SYN message 402 previously stored by the client 202 to the HPointer field of the SYN/ACK message 404. Client 202 may then generate and send a DATA message, as shown in FIG. 4B, to the ICS 204. FIG. 4B depicts a set of messages 400B, including a DATA message 406 and a DATA/ACK (data acknowledge) message 408, according to certain embodiments of the present disclosure. The DATA message 406 may include "type", "action", and "target ID" fields, as well as a copy of the ICScert, as in the SYN message 402. Further, the DATA message 406 may include a "payload" field, which may include a data payload for some DATA messages, but for the depicted DATA message 406 for opening a shell, the "payload" field may be empty or set to a 'null' value. The DATA message 406 may also include an "HPointer" field, as in the SYN/ACK message 404, which the client 202 may populate with the hash of the SYN/ACK message 404. The client 202 may sign the DATA message 406 prior to sending it to the ICS 204.

7. In FIG. 2, the ICS 204 may validate and forward the DATA message to the target 206, as described above. The ICS 204 may sign the DATA message prior to sending it to the target 206, or send it along a trusted channel.

8. The target 206 may validate the DATA message 406, as described above. The target 206 may compare the hash in the HPointer field of the DATA message 406 to the hash of the SYN/ACK message 404 previously stored by the target 206. Based on the DATA message 406, the target 206 may open a shell, and return a DATA/ACK message 408, as shown in FIG. 4B. The DATA/ACK message may include "type", "action", "target public key", and "HPointer" fields, as described elsewhere. The DATA/ACK message 408 may be signed by the target 206, and sent to the ICS 204 as shown in FIG. 2.

9. The ICS 204 forwards the DATA/ACK message 408 to client 202.

10. Client 202 receives the DATA/ACK message 408 and updates a state that there is a shell open on the target 206.

Although opening a shell was the example provided for 214, other communication channels between the client 202 and target 206 may be opened or established. For example, shell (e.g., shell/input), ssh tunnel (e.g., ssh/add-keys, ssh/input), communication with a kubernetes cluster (e.g., kube/exec, kube/restapi, kube/stream), file upload/download (e.g., file/upload, file/download), other website and database proxying, including connecting from the client 202 to other machines using the target 206 as a kind of gateway or jump server, or other connections or operations.

Continuing with the OpenShell example, once a shell has been opened, the client 202 may initiate shell communication operations 216, as described below:

1. Client 202 may generate a new random value, $r_c$.

2. Client 202 generates and sends a SYN message 402 to the ICS 204. Rather than the "action" field being populated with "OpenShell", however, the current SYN message 402 may have an action field of "ShellInput".

3. ICS 204 checks if client 202 is authorized to take the specified action on the designated target 206, and validates the SYN message 402. The SYN message 402 may be signed or otherwise authenticated by the ICS 204, and sent to the target 206.

4. Target 206 may read and validate the SYN message 402. If the message 402 is valid and authorized, the target 206 may compute a random value, $r_t$, and include that value in a SYN/ACK message 404. The target 206 may also store the hash of the SYN/ACK message 404, as described previously. The SYN/ACK message may be sent to the ICS 204, and forwarded to the client 202.

Figure 5:
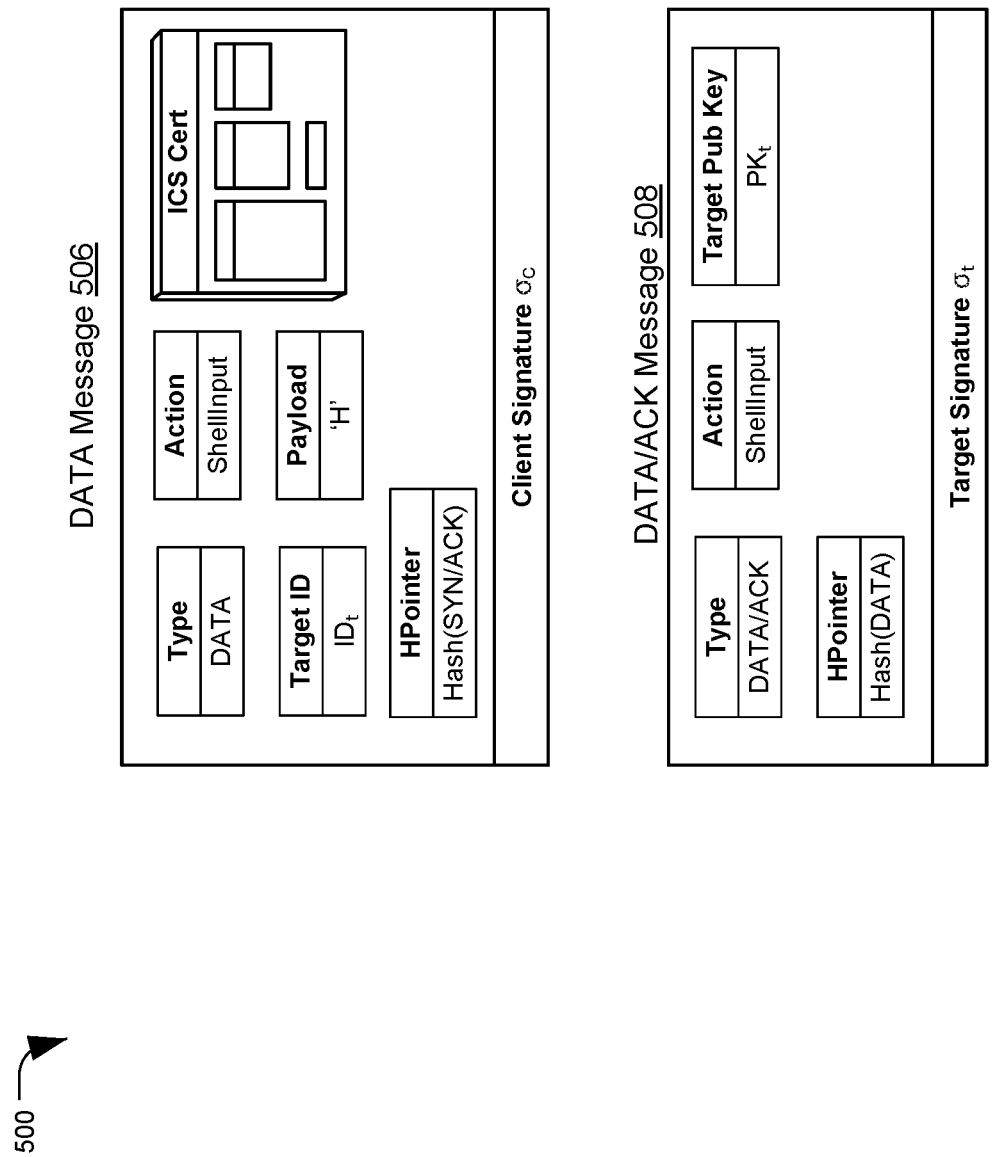
FIG. 5 depicts a set of messages for zero trust authentication, in accordance with certain embodiments of the present disclosure.

5. Client 202, having already completed the process of starting a shell, knows the shell is open on the target 206 and that the client 202 can start sending input. Client 202 sends a DATA message, as shown in FIG. 5, to the ICS 204. FIG. 5 depicts a set of messages 500, including a DATA message 506 and a DATA/ACK message 508, according to certain embodiments of the present disclosure. The DATA message 506 of FIG. 5 may have the same fields as DATA message 406 of FIG. 4. However, DATA message 506 may include an "action" field designating the current action as "ShellInput", and the "payload" field may have data content, designated as 'H', to send from the client 202 to the target 206. For example, the data content 'H' may comprise files to store, queries, keystrokes, or other data blobs (Binary Large Object).

6. Returning to shell communication 216 of FIG. 2, ICS 204 may validate, sign or authenticate, and forward the DATA message 506 to the target 206.

7. Target 206 may validate and read the DATA message 506, and forward the payload to the correct shell. The target 206 may generate and return a DATA/ACK message 508, as shown in FIG. 5. The DATA/ACK message 508 may have an HPointer field populated with a hash of the received DATA message 506. In some examples, the DATA/ACK message 506 may also include a "payload" field (not shown). The DATA/ACK message 506 may be received by the ICS 204 and forwarded to the client 202.

8. Client 202 can continue to send inputs, starting from step 5, above.

Figure 6:
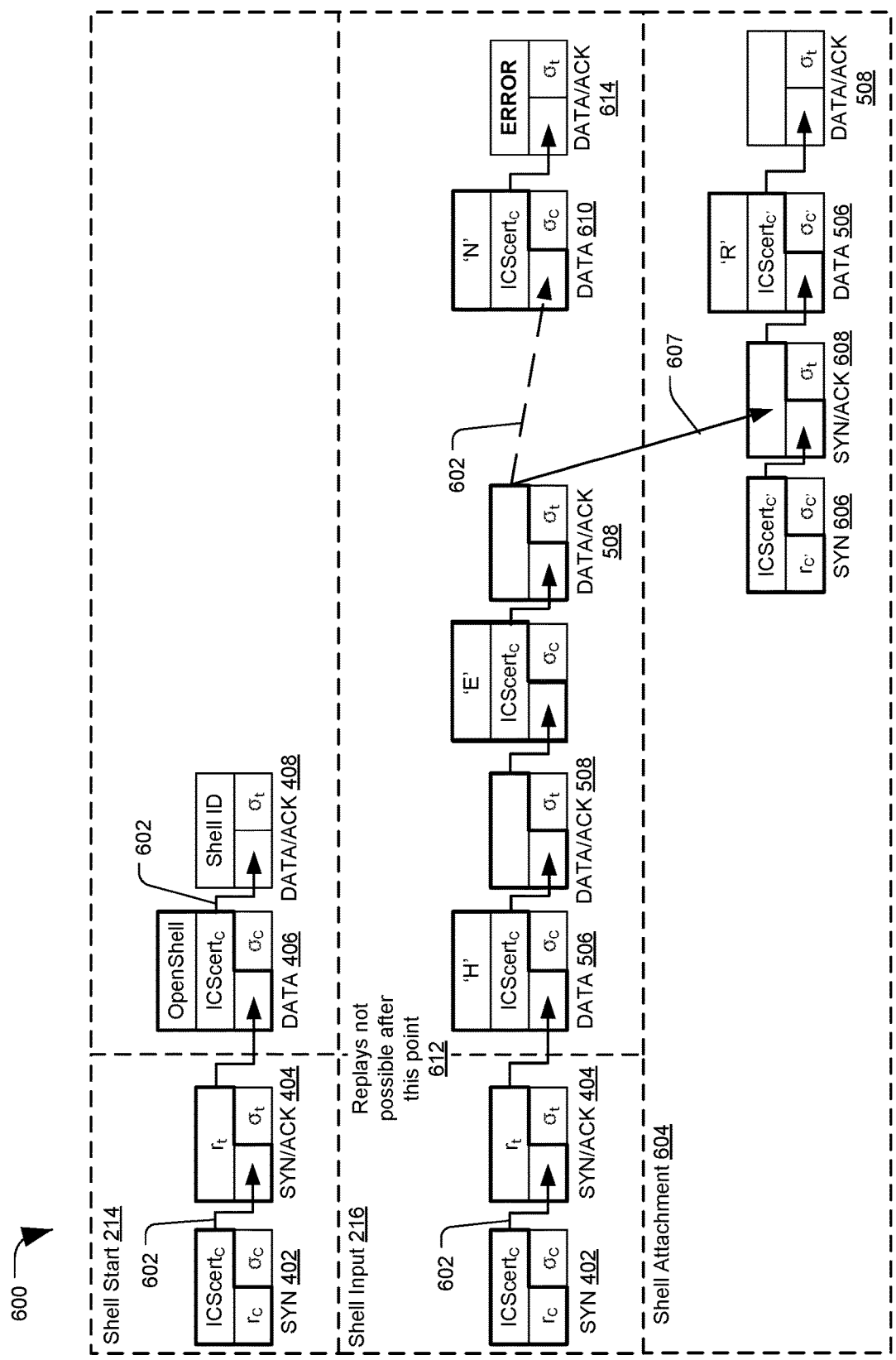
FIG. 6 is a flow diagram of a system configured for zero trust authentication, in accordance with certain embodiments of the present disclosure.

Turning now to FIG. 6, a flow diagram 600 is depicted of a system configured for zero trust authentication, in accordance with certain embodiments of the present disclosure. Diagram 600 may include a shell start operation 214 and a shell input operation 216, which may correspond to the open shell on target operation 214 and the shell communication operation 216, respectively, of FIG. 2. The shell start 214 and shell input 216 operations may comprise a series of SYN messages 402, SYN/ACK message 404, DATA messages 406 and 506, and DATA/ACK messages 408 and 508, as shown and described in relation to FIGS. 4A, 4B, and 5. The validation and forwarding performed by ICS 204, as well as some fields contained in messages may be omitted in the diagram 600 for brevity and clarity. Every communication with the shell may be initiated by the client.

The arrows 602 may indicate the hashing of all or a portion of the previous message, and storing the hash to a field in the subsequent message. For example, all of the previous message except the signature may be hashed and included in the response message. The bold outline around a portion of a message may indicate the fields that may be hashed into the subsequent message. This hashing of previous messages may prevent replay attacks after a certain point 612 in the communication chain.

Starting a shell 214 may require a distinct set of four messages, compared to sending regular shell input 216. Starting the shell 214 may be an example of a specific action that may require a client's 202 signature, and therefore it may be similar to opening an SSH tunnel. It may be dissimilar to closing a shell, which may be performed by an ICS 204 without the client's 202 signature.

A client 202 sending input 216 to the target 206 may include an initial 2-message handshake, and then can continue indefinitely, although a single client 202 may be required to have a valid ICS certificate which may expire upon logout or after a pre-defined period of time. Sending commands or data to a shell may include use of the shell/attachment/<id> action, since there may need to be an existing shell for any user to interact with it.

Shell attachment 604 may be a process by which a user may login with a first client (c) and open a shell, and concurrently login with a second client (c') and still have commands accepted by the target 206. Shell attachment 604 may be performed via the following example sequence.

1. Alice logs into a new client, c', and wants to access the same shell that was opened through a different client, c. The login process for c' may include the login process 210 described in regard to FIG. 2, and obtaining an ICS certificate for c' (ICScert$_{c'}$). The client c' may also perform the target selection operation 212.

2. Client c' may generate a new random value, $r_{c'}$.

3. Client c' sends a SYN message 606 to the ICS 204.

4. The ICS 204 checks if Alice is authorized to take this action on the specified target 206, and validates and forwards the SYN message 606 to the target 206.

5. The target 206 reads and validates the SYN message 606, and may determine an association between the new client c', and the previous client c and its associated shell input sequence 216, for example based on the user ID or other information. The target 206 may generate a SYN/ACK message 608 to the SYN message 606 for the new client c'. However, in place of the random number ($r_t$) the target 206 usually generates for the SYN/ACK message, the target 206 instead may calculate 607 the hash of the previous DATA/ACK message 508 in the chain. This hash pointer 607 may allow the continuation of an immutable log (e.g., at the ICS 204) while still guaranteeing non-replayability due to the randomness in the initial SYN 606, SYN/ACK 608 exchange. The SYN/ACK message 608 may be passed through the ICS 204 back to the client c'.

6. Alice, connected through client c', can now execute commands as directed in the 'Shell Input' section above, via further DATA 506 and DATA/ACK 508 messages.

In some embodiments, connecting with a new client may cut off a previously connected client. In the example of FIG. 6, when client c 202 issues a new DATA message 610 after the target 206 received SYN message 606 and generated SYN/ACK message 608 for client c', the target 206 may issue an "ERROR" response in DATA/ACK message 614. For example, the hash included in DATA message 610 may not correspond to the target's 206 most recently issued DATA/ACK message 608, resulting in DATA message 610 not being recognized. Methods performed by actors of FIGS. 1 and 2 are described in greater detail in regard to the following figures.

Figure 7:
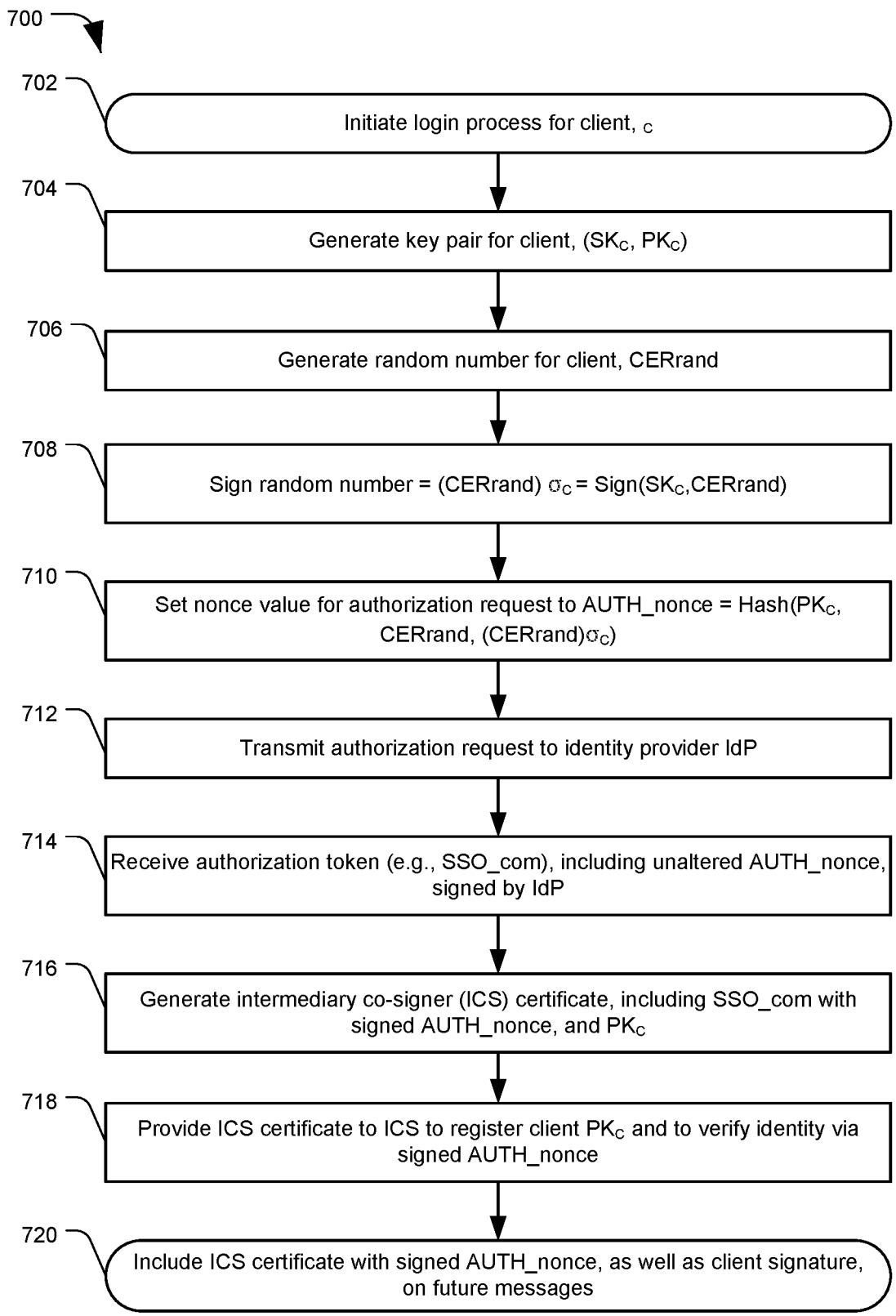
FIG. 7 depicts a flowchart of an example method for zero trust authentication, in accordance with certain embodiments of the present disclosure.

FIG. 7 depicts a flowchart of an example method 700 for zero trust authentication, in accordance with certain embodiments of the present disclosure. In particular, method 700 may include an example process for generating and using an intermediary co-signer (ICS) certificate to authenticate the client during authentication communications. Method 700 may be performed by a client system, such as client 102 of FIG. 1 or 202 of FIG. 2.

At 702, the method 700 may include initiating a login process for client c. This may correspond to the login process 210 of FIG. 2, where a client 202 wishes to log in to an intermediary co-signer 204 based using an authorization token obtained from an identity provider (IdP) 208.

The method 700 may include generating or retrieving a key pair for the client, including a secret or private key ($SK_C$) and a public key ($PK_C$), at 704. At 706, the method 700 may include generating a random number for the client, CERrand, which may be used help uniquely identify the client in the final authorization token. The method 700 may include signing the random number CERrand with the client's secret key $SK_C$ to generate a signed random value $(CERrand)\sigma_C$, at 708.

At 710, the method 700 may include setting a nonce value for an authorization request, AUTH_nonce, by hashing together CERrand, $(CERrand)\sigma_C$, and the client's public key, $PK_C$. The combination of CERrand and $(CERrand)\sigma_C$ may be collectively referred to as CERanc, for ancillary certificate information. Accordingly, AUTH_nonce may be set to Hash($PK_C$, CERanc). In cryptography, a nonce may be an arbitrary number that can be used just once in a cryptographic communication. In some IdP authorization operations, a client may merely provide a randomly-generated value as a nonce during a login request, which the IdP may sign and return as part of the authorization token. However, by hashing the random value CERrand along with the client's public key, the client may produce a random value that still personally identifies the client, which random value then gets signed by the IdP authority. In this manner, the client may obtain a personally-identifying value that has been verified and signed by a trusted IdP, while still providing the requisite randomness for the authorization request.

After generating AUTH_nonce, the client may submit it to the IdP in an authorization request, along with other identifying criteria that the IdP may require to provide an authorization token, at 712. At 714, the method 700 may include receiving the authorization token (e.g., SSO_com), including the unaltered AUTH_nonce, signed by the IdP.

At 716, the method 700 may include generating an ICS certificate, including the SSO_com with the signed AUTH_nonce, a copy of the client's public key, and a copy of CERanc. The ICS certificate may be provided to the ICS to register the client's public key, and to verify the client's identity via the signed AUTH_nonce, at 718. The identity of the client may be verified using a copy of the IdP's public key, the copy of the client's public key, and the unhashed copy of CERanc. In this manner, the client may be logged in with the ICS, and may be able to access targets secured through the ICS. The client's ICS certificate with the signed AUTH_nonce may be included with future communications to authenticate the client to the ICS or the target, at 720. The method 700 may also include signing future messages with the client's secret key. A method of verifying a client from the perspective of the ICS is discussed in regard to FIG. 8.

Figure 8:
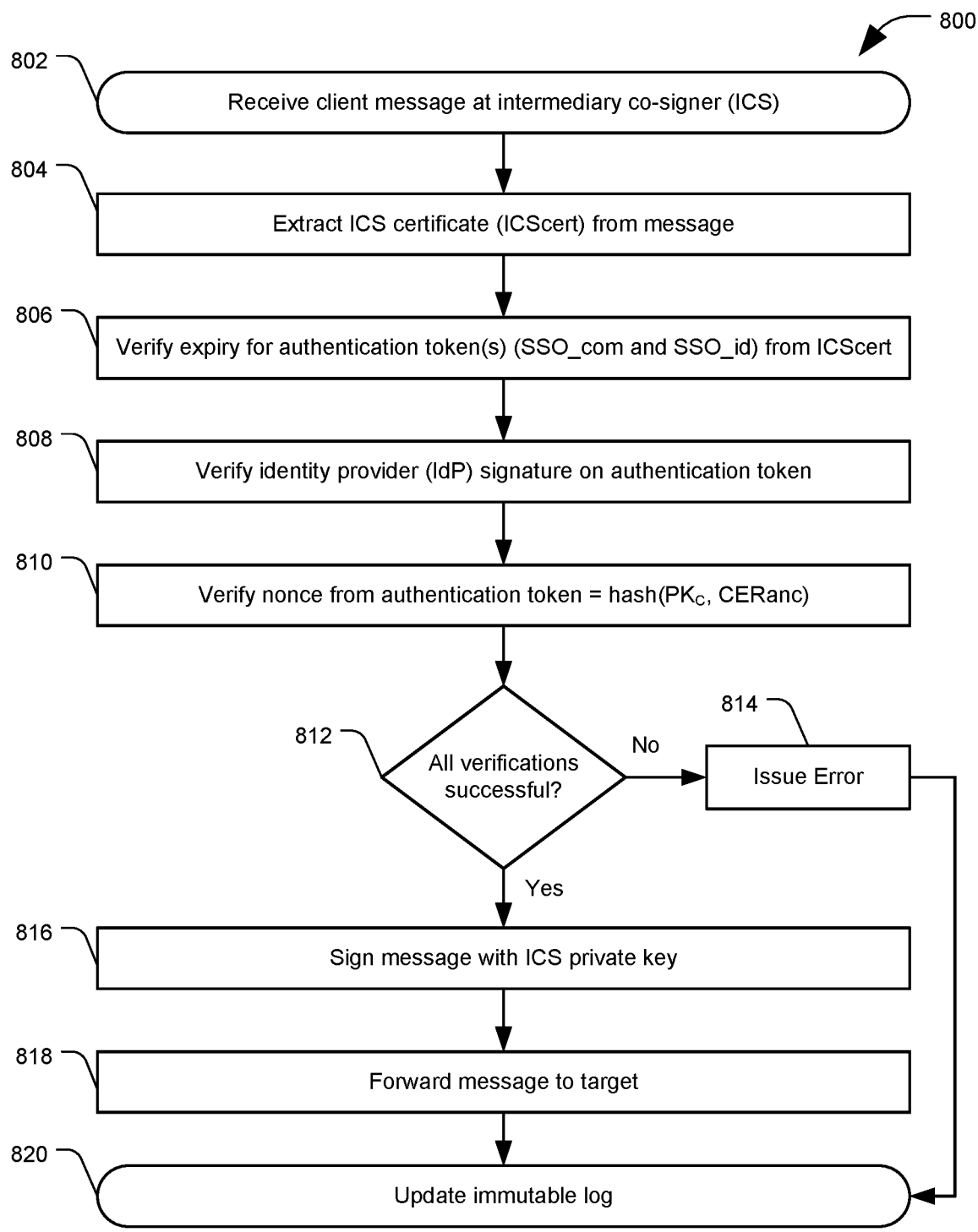
FIG. 8 depicts a flowchart of an example method for zero trust authentication, in accordance with certain embodiments of the present disclosure.

FIG. 8 depicts a flowchart of an example method 800 for zero trust authentication, in accordance with certain embodiments of the present disclosure. In particular, method 800 may include an example process for verifying the authenticity of a client communication and the identity of a corresponding user at an intermediary co-signer (ICS) during authentication communications. Method 800 may be performed by an ICS system, such as ICS 104 of FIG. 1 or 204 of FIG. 2.

Method 800 may include receiving a client message at an ICS, at 802. The message may include a SYN message from the client requesting to login to the ICS, open a shell to a specified target, or initiate a shell input or communication on an already open shell. In some embodiments, the message may include a DATA message, or any other communication from the client to the ICS.

The method 800 may include extracting the ICS certificate (ICScert) from the message, at 804, and verifying the expiry for a most recent authorization token in the ICScert (e.g., SSO_com or SSO_id), at 806. At 808, the method 800 may include verifying the identity provider (IdP) signature on the authorization token, which signature may have been used to sign the entire authorization token, the AUTH_nonce in the token, or a combination thereof. The ICS may obtain a copy of the IdP's public key from a trusted source in order to verify the signature. At 810, the method 800 may include verifying that the AUTH_nonce from the authorization token is set to the hash ($PK_C$, CERanc), as described in regard to FIG. 7, based on information provided in the ICScert.

A determination may be made, at 812, whether all verification operations have been successful, indicating that the client message has been verified and authenticated. If not, the method 800 may include issuing an error, at 814, and updating an immutable log at the ICS, at 820. The issued error may include storing the error to the log, issuing an error message to the client that sent the message, issuing an error to a target specified in the message, issuing an error in other ways, or any combination thereof.

If a determination is made that all verifications were successful, at 812, the method 800 may include signing the message with the ICS's secret or private key, $SK_{ICS}$, at 816. Alternately, the ICS may not sign the message, and instead may provide authentication for the message in other ways, such as by forwarding the message over an established and trusted TLS connection. The message may be forwarded to the target specified in the message, at 818. In embodiments where the ICS signs the message, the ICS may provide the target with a copy of the ICS's public key, $PK_{ICS}$, along with or separately from the message. By providing messages including signatures from both the client and the ICS, a target may be able to perform authentication, without the need for encryption. After forwarding the message, the method 800 may include updating the immutable log, at 820.

In embodiments where the message was a login request, rather than signing the message and forwarding it from the ICS to the target, at 816 and 818, the method 800 may include logging the client in and sending a SYN/ACK message back to the client indicating that the login was successful. The method may still involve updating a log, at 820. A method of authentication, as performed by a target system, is described in regard to FIG. 9.

Figure 9:
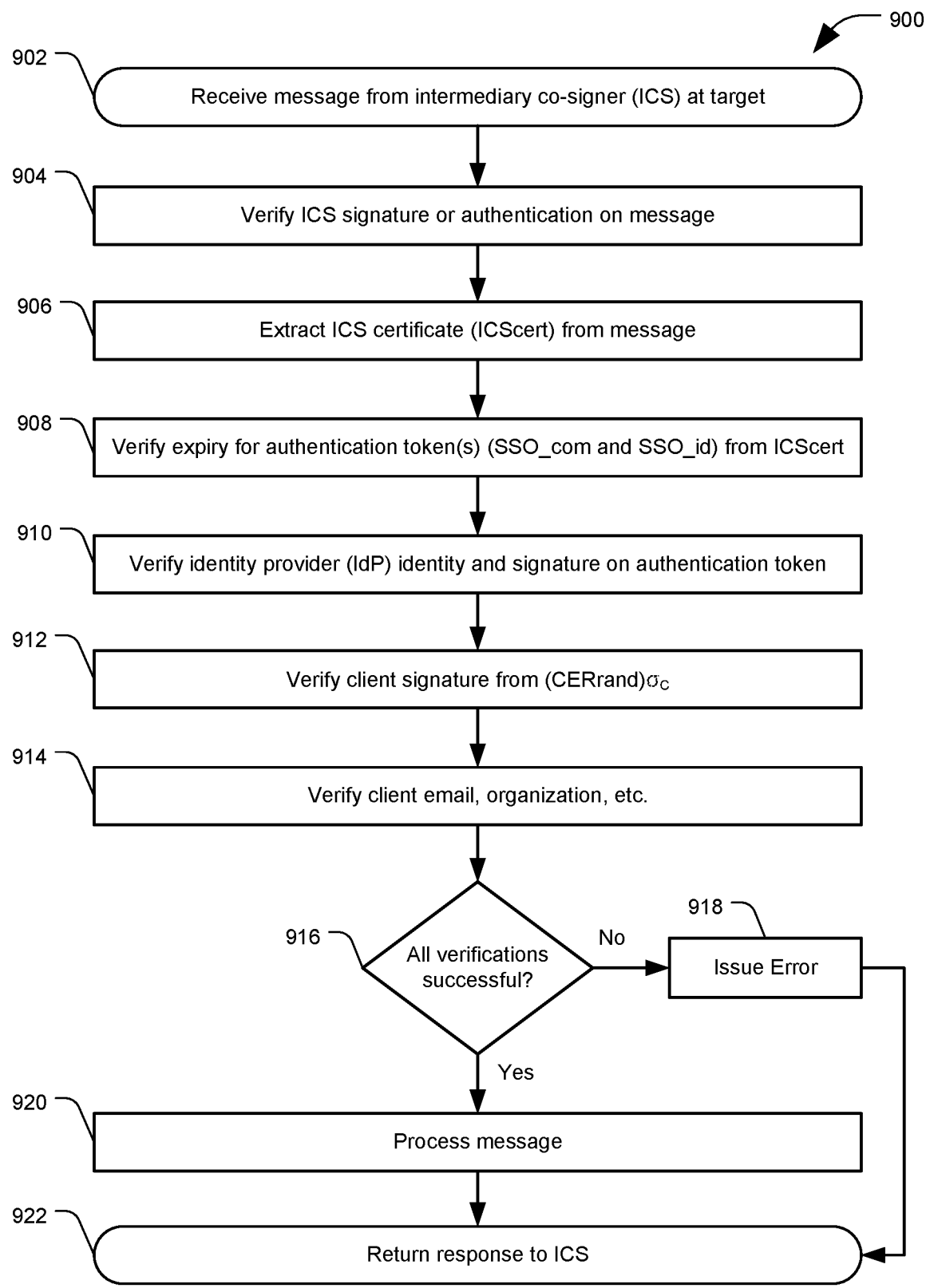
FIG. 9 depicts a flowchart of an example method for zero trust authentication, in accordance with certain embodiments of the present disclosure.

FIG. 9 depicts a flowchart of an example method 900 for zero trust authentication, in accordance with certain embodiments of the present disclosure. In particular, method 900 may include an example process for performing authentication on a message received at a target prior to executing any commands included in the message. Method 900 may be performed by a target system, such as target 10 of FIG. 1 or 206 of FIG. 2, or by an agent program or driver installed at or executed by a target, such as agent 112 of FIG. 1.

The method 900 may include receiving a message from an intermediary co-signer (ICS) at a target, at 902. The message may be signed by a client system that initially sent the message, and may optionally be signed by the ICS that verified the authenticity of the message before forwarding it to the target. The message may be signed using, for example, secret keys of a signing party, which signatures may be verified using corresponding public keys. In some embodiments, the ICS may authenticate the message in other ways, such as by forwarding the message over a TLS WebSocket connection.

The method 900 may include verifying the ICS signature or other authentication on the message, at 904, and extracting an ICS certificate (ICScert) from the message, at 906. Expiration times or dates for authorization token(s) (e.g., SSO_com and SSO_id) in the ICScert may be verified, at 908, and the identity and signature of an identity provider (IdP) may also be verified from the authorization token, at 910. At 912, the method 900 may include verifying the client signature, e.g., from a signed random value, $(CERrand)\sigma_C$, included in an authorization token, which was itself signed by the IdP. The method 900 may also include verifying the client's email, organization, and other criteria that may indicate whether or to what extent the client has permission to perform actions at the target. For example, a user associated with the client may be a member of a correct organization to access the target, but may not have sufficient clearance to perform the operation requested in the message. Verifying the client information may include comparing the details included in the message against a lookup table or similar system accessible to the target, or the details in the message may be accepted as reliable if the message itself has passed all other verifications (e.g, the ICS authentication at 904, the expiry verification at 908, the IdP signature at 910, and the client signature at 912). Access rights may be determined and verified by looking up the client in an access rights table once the message has been verified.

A determination may be made whether all verifications were successful, at 916, indicating that all credentials and signatures in the message were verified and the client is permitted to perform any operation specified in the message. If not, the method 900 may include issuing an error, at 918, and returning a response to the ICS, at 922. Issuing the error may include returning the message to the ICS, sending a message to be returned to the client, creating a log entry at the target, or issuing any other error indicator.

If all verifications were determined to be successful, at 916, the method 900 may include processing the message, at 920, and returning a response to the ICS, at 922. Processing the message may include executing an operation or calculation based on data from the message, such as entering information into a database, retrieving and returning data, initiating a process, or any other operation. An example computing system that may be used to perform operations for zero-trust authentication, such as depicted in FIGS. 2, 7, 8, and 9, is shown in FIG. 10.

FIG. 10 is a diagram of a system 1000 configured for zero trust authentication, in accordance with certain embodiments of the present disclosure. In particular, FIG. 10 depicts a computer system 1002, which may be an example of any computing system that may be employed to perform the operations of client 102, intermediary co-signer 104, target 106, or identity provider 108, and related processes and methods. Computing system 1002 may include a processing system 1004, a communication interface 1006, and a user interface 1008. Computing system 1002 may include other components such as a battery and enclosure that are not shown for clarity. Computing system 1002 may comprise one or more server computing systems, desktop computing systems, laptop computing systems, smartphone devices, or any other computing system, including combinations thereof.

Communication interface 1006 may comprise components that communicate over communication links, such as network cards, ports, radio frequency (RF), processing circuitry and software, or some other communication devices. Communication interface 1006 may be configured to communicate over metallic, wireless, or optical links. Communication interface 1006 may be configured to use Time Division Multiplex (TDM), Internet Protocol (IP), Ethernet, optical networking, wireless protocols, communication signaling, other communication formats, or any combinations thereof. In particular, communication interface 1006 may be configured to communicate over a network with client systems 102, identity providers 108, intermediary co-signers 104, and target systems 106.

User interface 1008 may comprise components that interact with a user to receive user inputs and to present media or other information. User interface 1008 may include a display screen, touch screen, touch pad, keyboard, buttons, speaker, microphone, pointer device or interface, communication port, other user input/output apparatus, or any combination thereof.

Processing system 1004 may be linked to communication interface 1006 and user interface 1008. Processing system 1004 can include processing circuitry 1010 and memory device 1012. Memory device 1012 can store executable instructions or other operating software 1016, and logs, tables, databases, or other stored information 1014.

Processing circuitry 1010 may comprise a microprocessor and other circuitry that can retrieve and execute instructions 1016 from memory device 1012. Memory 1012 may comprise a non-volatile data storage medium, such as a disk drive or solid state drive, or volatile memory such as random access memories (RAM) and dynamic RAM (DRAM), or any other memory apparatus. Processing circuitry 1010 may be mounted on a circuit board that may also hold memory device 1012 and portions of communication interface 1006 and user interface 1008.

Executable instructions 1016 may comprise computer programs, firmware, or some other form of machine-readable processing instructions. Executable instructions 1016 may include authorization module 1018, and communication module 1020, although related operations may be handled by multiple different modules or programs, and additional modules may be included in executable instructions 1016. Executable instructions 1016 may further include an operating system, utilities, drivers, network interfaces, applications, or some other type of software. When executed by processing circuitry 1010, executable instructions 1016 may direct processing system 1004 to operate computing system 1002 as described herein.

Authorization module 1018 may be a set of instructions for obtaining authorization for accessing a target, or for verifying the authenticity of a request to communicate with a target. For example, for a computing system 1002 representing a client system 102, the authorization module 1018 may include instructions for performing the method 700 to generate an ICS certificate and login to an ICS, or the process shown for client 202 in FIG. 2 to access and communicate with target 206. For a computing system 1002 representing an ICS 104, the authorization module 1018 may include policy rules 116, and may include the method 800 for authorizing client messages, or the process shown for ICS 204 in FIG. 2. For a computing system 1002 representing a target 106, the authorization module 1018 may include code for agent 112, and may include the method 900 for authorizing client messages received from ICS 104, or the process shown for target 206 in FIG. 2.

Communication module 1020 may include a set of instructions for communication protocols involved in sending and receiving the messages of FIG. 2. The instructions may include a sequence of messages to send and receive, as well as the format of messages as shown in FIGS. 4A, 4B, 5, and 6. For example, the communication module 1020 may direct the processing circuitry 1010 of a client system on how to create a SYN message 402, including what data to populate into each field, and instructions on sending the SYN message to a designated ICS via the communication interface 1006.

Log 1014 may represent stored data of the system 1002. In an example of a client system 202, the log 1014 may include information such as the clients public and secret key, a copy of the ICS certificate, and a hash of a last-received ACK message, which may be needed to insert into a next message transmitted by the client system 202. In an example of an ICS, the log 1014 may include an immutable log of a transmission or transaction history between client systems and targets, which the ICS may be configured to add to, but be unable to modify or delete existing entries. The ICS log 1014 may also include information such as the ICS's public and secret keys, private keys for recognized IdPs, access permissions for different users to supported targets, or other information. In an example of a target system, the log 1014 may include the target's public and secret keys, trusted IdP and ICS public keys, message or access logs, user access permissions, or other data.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g. steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method performed by a client computing system, the method comprising:
   providing, to an identity provider (IdP) authority, an authentication nonce value generated by hashing together at least a random value and a public key of the client computing system;
   receiving, from the IdP authority, an OAuth authorization token including the authentication nonce value generated by hashing together at least the random value and the public key of the client computing system, wherein the OAuth authorization token is signed by a private key of the IdP authority;
   providing, to an intermediary co-signer (ICS) system configured to authenticate messages, a synchronization message directed to a target computing system and including the OAuth authorization token from the client computing system, wherein the synchronization message includes a value indicating to open a shell on the target computing system, wherein the shell comprises a communication channel;
   receiving, at the client computing system, a synchronization acknowledgement message in response to the synchronization message;
   generating, at the client computing system, a data message to the target computing system, including hashing a copy of the synchronization acknowledgement message to include in the data message; and
   providing, from the client computing system, the data message directed to the target computing system via the ICS system.

2. The method of claim 1 further comprising:
   signing the random value with a private key of the client computing system to produce a signed random value;
   wherein the authentication nonce value is generated further by hashing at least the random value, the public key of the client computing system, and the signed random value.

3. The method of claim 2, further comprising:
   generating an authorization certificate that includes:
      the OAuth authorization token signed by the private key of the IdP authority;

the public key of the client computing system;
the random value; and
the signed random value; and
including the authorization certificate in the synchronization message to the ICS system.

4. The method of claim 1, further comprising:
the synchronization acknowledgement message includes a hashed copy of the synchronization message;
comparing, at the client computing system, a hash of the synchronization message with the hashed copy of the synchronization message; and
generating the data message only when the hash of the synchronization message matches the hashed copy of the synchronization message.

5. The method of claim 1, wherein the synchronization message is signed using a private key of the client computing system.

6. A method performed by an intermediary co-signer (ICS) system, the method comprising:
receiving, from a client system at the ICS system, a synchronization message including an OAuth authorization token, wherein the synchronization message is configured to open a shell to a target computing system, the shell comprising a communication channel;
extracting the OAuth authorization token from the synchronization message, wherein the OAuth authorization token includes an authentication nonce value and a signature of the OAuth authorization token that is signed by an identity provider (IdP) authority;
verifying the signature of the OAuth authorization token that is signed by the IdP authority;
verifying the authentication nonce value from the OAuth authorization token, wherein the authentication nonce value is a result of a hash function applied to at least a random value and a public key of the client system;
responsive to successfully verifying both the signature of the OAuth authorization token that is signed by the IdP authority and the authentication nonce value from the OAuth authorization token, providing the synchronization message to the target computing system;
receiving, at the ICS system, a synchronization acknowledgement message including a hashed copy of the synchronization message;
sending the synchronization acknowledgement message to the client system;
receiving, at the ICS system, a data message from the client system directed to the target computing system;
verifying, at the ICS system, that the data message includes a hashed copy of the synchronization acknowledgement message; and
responsive to verifying that the data message includes the hashed copy of the synchronization acknowledgement message, providing the data message to the target computing system.

7. The method of claim 6 further comprising:
when a verification of both the signature of the OAuth authorization token that is signed by the IdP authority and the authentication nonce value from the OAuth authorization token fails:
issuing an error regarding the synchronization message not being verified; and
not providing the synchronization message to the target computing system.

8. The method of claim 6 further comprising:
maintaining an immutable log for transmissions between the client system and the target computing system, to which the ICS system can add entries but cannot modify or delete entries; and
adding a log entry to the immutable log based on a first result of the verifying the signature of the OAuth authorization token that is signed by the IdP authority, and a second result of the verifying the authentication nonce value from the OAuth authorization token.

9. The method of claim 6 further comprising:
signing the synchronization message using a private key of the ICS system.

10. The method of claim 6 further comprising:
establishing a trusted communication link between the ICS system and the target computing system; and
wherein the synchronization message is provided from the ICS system to the target computing system over the trusted communication link.

11. The method of claim 10, wherein the trusted communication link includes a transport layer security (TLS) WebSocket connection.

12. A method comprising:
providing, from a client computing system to an identity provider (IdP) authority, an authentication nonce value generated by hashing together at least a random value and a public key of the client computing system;
receiving, at the client computing system from the IdP authority, an OAuth authorization token including the authentication nonce value generated by hashing together at least the random value and the public key of the client computing system, wherein the OAuth authorization token is signed by a private key of the IdP authority;
providing, from the client computing system to an intermediary co-signer (ICS) system configured to authenticate messages, a synchronization message directed to a target computing system and including the OAuth authorization token, wherein the synchronization message includes a value indicating to open a shell on the target computing system, wherein the shell comprises a communication channel;
receiving the synchronization message from the client computing system at the (ICS) system;
extracting the OAuth authorization token from the synchronization message at the ICS system, wherein the extracted OAuth authorization token includes a signature of the OAuth authorization token that is signed by the IdP authority;
verifying the signature of the OAuth authorization token that is signed by the IdP authority;
verifying, at the ICS system, the authentication nonce value from the OAuth authorization token;
responsive to successfully verifying both the signature of the OAuth authorization token that is signed by the IdP authority and the authentication nonce value from the OAuth authorization token, providing the synchronization message from the ICS system to the target computing system;
receiving, at the ICS system from the target computing system, a synchronization acknowledgement message including a hashed copy of the synchronization message;
sending the synchronization acknowledgement message to the client computing system;
receiving, at the client computing system, the synchronization acknowledgement message;
generating, at the client computing system, a data message to the target computing system, including hashing a copy of the synchronization acknowledgement message to include in the data message;
providing, from the client computing system, the data message to the ICS system, wherein the data message is directed to the target computing system;
receiving, at the ICS system, the data message from the client computing system directed to the target computing system;
verifying, at the ICS system, that the data message includes the hashed copy of the synchronization acknowledgement message; and
responsive to verifying that the data message includes the hashed copy of the synchronization acknowledgement message, providing the data message from the ICS system to the target computing system.

13. The method of claim 12 further comprising:
signing the random value with a private key of the client computing system to produce a signed random value;
wherein the authentication nonce value is generated further by hashing at least the random value, the public key of the client computing system, the random value, and the signed random value.

14. The method of claim 13 further comprising:
generating, at the client computing system, an authorization certificate including:
the OAuth authorization token signed by the private key of the IdP;
the public key of the client computing system;
the random value; and
the signed random value;
including the authorization certificate in the synchronization message to the ICS; and
signing, at the client computing system, the synchronization message using a private key of the client computing system.

15. The method of claim 12 further comprising:
maintaining, at the ICS system, an immutable log of transmissions between the client computing system and the target computing system, to which the ICS system can add entries but cannot modify entries; and
adding, by the ICS system, a log entry to the log based on a first result of the verifying the signature of the OAuth authorization token that is signed by the IdP authority, and a second result of the verifying the authentication nonce value from the OAuth authorization token.

16. The method of claim 12 further comprising:
at least one of:
signing the synchronization message using a private key of the ICS system; and
wherein the synchronization message is provided from the ICS system to the target computing system over a trusted communication link established between the ICS system and the target computing system.

* * * * *